Jan. 16, 1968  H. W. ENSIGN  3,363,762
REMOVABLE ELEMENT FILTER ASSEMBLY HAVING FLOW PREVENTING MEANS
Filed Dec. 29, 1964

INVENTOR
Harold W. Ensign

BY Bacon & Thomas
ATTORNEYS

United States Patent Office 3,363,762
Patented Jan. 16, 1968

3,363,762
REMOVABLE ELEMENT FILTER ASSEMBLY
HAVING FLOW PREVENTING MEANS
Harold W. Ensign, Fullerton, Calif., assignor to
Donald G. Griswold, Newport Beach, Calif.
Filed Dec. 29, 1964, Ser. No. 421,833
3 Claims. (Cl. 210—136)

ABSTRACT OF THE DISCLOSURE

A one piece, T-shaped body having axially aligned inlet and strainer chambers therein separated by a partition which has an opening therein forming a valve seat, one valve inserted through the inlet end of the inlet chamber and urged against the partition seat by fluid pressure, a plug inserted into the end of the strainer chamber opposite the partition, a filter screen and a rod mounted on the plug, the rod pushing the valve open when the plug is inserted into the body, the body having a check valve controlled outlet medially of the length of the body communicating with the strainer chamber.

---

This invention relates to a combined valve and strainer unit construction to be connected in a fluid line to remove particles of rust or other foreign matter from any liquid flowing through the line.

More particularly, the invention relates to a strainer valve assembly having self-contained valve means which automatically shut off flow whenever the strainer unit is removed for cleaning or replacement, without causing any appreciable pressure drop or discharge of liquid from the line.

It is common practice to employ a strainer drive in a fluid line to remove foreign substances from the fluid flowing therein, such strainer devices being used, for example, in lines which conduct operating fluid to pilot valves and other equipment provided with relatively small passages that can easily become clogged by foreign matter suspended in the fluid. While numerous strainer devices are available for this purpose, none is known which has the advantages possessed by the present invention.

A conventional strainer device typically will include a body of housing and a removable screen-like strainer element of a mesh size that will pass liquid but screen out fine particles suspended in the liquid. Because the strainer element will eventually become clogged by the matter strained from the liquid flowing therethrough, it must periodically be cleaned or replaced. However, the major problem with prior strainer devices is that they require at least a manually operated shut-off valve to be arranged ahead of the strainer element, either in the line or in the strainer body itself to close off flow therethrough while the strainer element is removed. In some instances a shut-off valve is connected in the line on both the upstream and downstream sides of the device. Otherwise, fluid will unavoidably be discharged as soon as the device is opened to remove the strainer element.

In fluid lines provided with one or more shut-off valves spaced from the strainer device, the fluid contained in the line between such valves is normally released when the strainer element is removed, which creates an undesirable liquid dumping problem. Further difficulties arise when separately operated manual valves are provided in the strainer device or in the fluid line, due to inexperienced or careless operating personnel sometimes failing to close the valves before removing the strainer element, or failing to open the valves after replacing the strainer element.

Such problems are completely avoided by the present invention, which includes a pair of automatically operated check valves contained in the strainer body to control fluid flow, and wherein both check valves close when the strainer unit is removed, and wherein one check valve is reopened automatically against line pressure incidental to the strainer unit being reinstalled and the other is opened automatically thereafter by line pressure.

Briefly, the instant strainer valve assembly includes a valve body having an inlet, an outlet, and a strainer chamber disposed between said inlet and said outlet for receiving a removable strainer unit. The valve body has a pair of one-way check valves mounted therein: an inlet check valve at the inlet to the strainer chamber, and an outlet check valve at the outlet thereof.

The strainer body also has a threaded opening communicating with and preferably axially aligned with, the strainer chamber. The removable strainer unit includes a threaded plug which is mounted in the aforesaid threaded opening and carries an operating rod or stem that holds the inlet check valve in an open position when the strainer unit is properly installed within the valve body, and which releases said check valve to be closed by line pressure when the strainer unit is removed from the strainer body. The check valve at the outlet of the strainer chamber is arranged to permit fluid flow only in a direction from the strainer chamber into a conduit connected with the outlet of the valve body. Thus, reverse flow from the fluid line into the strainer chamber is automatically prevented. The two check valves thus function to seal off the inlet and outlet of the strainer chamber when the strainer unit is removed therefrom, whereby no fluid will be discharged from the line through said chamber.

The strainer assembly of the present invention thus eliminates the need for separate shut-off valves in a fluid line on opposite sides of a strainer assembly, with consequent economies and simplification of operation. Further, the instant strainer assembly is entirely automatic in operation, flow being automatically closed off when the strainer unit is removed from the strainer body, and being automatically restored when the strainer unit is mounted in place within the strainer chamber.

The principal object of this invention is to provide a strainer valve assembly, the strainer element of which can be readily removed without any appreciable discharge of line liquid or drop in line pressure.

Another object is to provide a strainer valve assembly constructed so that all fluid flow therethrough is automatically shut off when the strainer unit is disassembled to permit cleaning or replacement of the strainer element.

Still another object is to provide a strainer valve assembly embodying a replaceable strainer element that can be easily removed for cleaning or replacing.

A further object is to provide a strainer valve assembly having an inlet check valve and a removable strainer unit constructed so that when the strainer unit is removed or installed, the inlet check valve will be automatically closed or opened, respectively.

Other objects and many of the attendant advantages of the invention will become more readily apparent from the following detailed description when taken in connection with the accompanying drawings, wherein.

Figure 2:
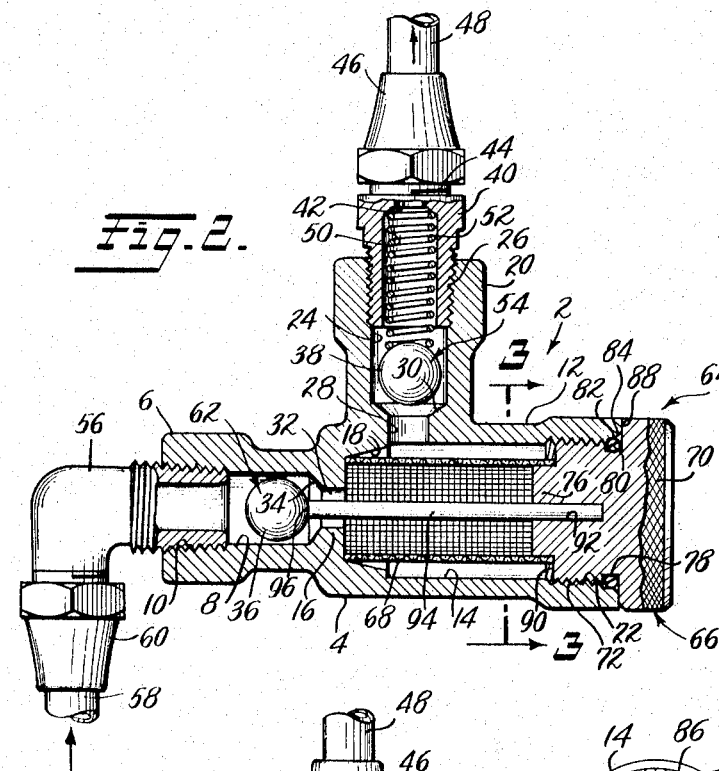
FIG. 2 is a vertical cross-sectional view, taken generally along the line 2—2 of FIG. 1, showing the strainer valve assembly as it appears when fluid is flowing therethrough.
Figure 1:
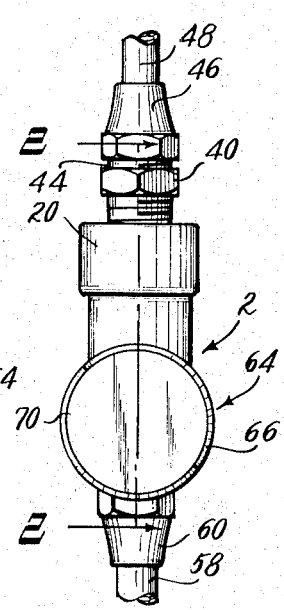
FIG. 1 is an end elevational view of the strainer valve assembly of the invention.
Figure 3:
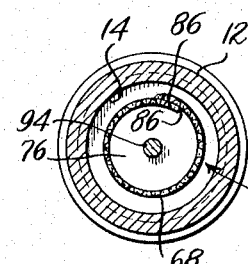
FIG. 3 is a vertical cross-sectional view taken along the line 3—3 of FIG. 2, through the valve body and strainer element.

Referring now to the drawings, the strainer valve assembly is indicated generally at 2, and includes a one piece T-shaped valve body 4. While the valve body 4 is shown to be T-shaped, it is to be understood that it might assume other configurations without departing from the invention; for example, the body could be in the shape of a Y.

One leg 6 of the valve body 4 has an inlet chamber 8 therein which includes a threaded inlet portion or opening 10 at the outer end thereof. A leg 12 of the valve body 4, in axial alignment with the leg 6, has a generally cylindrical strainer chamber 14 therein, which terminates at its inner end in a radial partition 16 separating the said strainer chamber from the inlet chamber 8. The strainer chamber 14 is substantially larger in diameter than the inlet chamber 8, and includes a reduced-diameter, frusto-conical portion 18 at its inner end, and a threaded portion 22 at the outer end thereof. A center leg or stem 20 of the valve body 4 is positioned in the region of the inner end of the strainer chamber 14 approximately medially of the length of the body 4 and at a right angle thereto.

The leg 20 of the valve body 4 has an outlet chamber 24 therein of a diameter corresponding to that of the inlet chamber 8. The outlet chamber 24 includes a threaded outer portion 26 and communicates at its inner end with the strainer chamber 14 through a cylindrical outlet port 28 of reduced diameter. The outlet port 28 is positioned immediately adjacent the frusto-conical portion 8 of the strainer chamber 14, and a frusto-conical seat 30 surrounds the end thereof which opens into the outlet chamber 24.

An inlet port 32 of reduced diameter is provided in the partition or wall 16 axially of the inlet chamber 8 and the strainer chamber 14, and interconnects the two chambers. A frusto-conical seat 34 surrounds the end of the inlet port 32 which opens into the inlet chamber 8. A ball 36 serves as a valve element and is insertable into the inlet chamber 8 through the inlet opening 10 and has a diameter slightly less than that of said chamber, said ball being seatable on the frusto-conical seat 34 to form an inlet check valve 62 for closing off flow from the inlet chamber 8 through the inlet port 32 to the strainer chamber 14.

A valve element comprising a ball 38 is disposed within the outlet chamber 24 and is seatable on the frusto-conical seat 30 to close the outlet port 28 against flow from the outlet chamber 24 into the strainer chamber 14. A fitting 40 having an axial bore 42 is threaded into the outer end 26 of the outlet chamber 24, the outer end of said fitting having threads 44 thereon for connection to a sleeve 46 that connects a conduit 48 to the strainer valve assembly 2. The fitting 40 has a counterbore 50 therein in axial alignment with the outlet port 28, within which is seated the one end portion of a coil spring 52. The other end of the spring 52 is in engagement with the ball 38, and the spring is under sufficient compression to insure seating of said ball on the seat 30, except when there is sufficient fluid pressure in the strainer chamber 14 to cause the outlet check valve 54 defined by the ball 38 and seat 30, to open.

An elbow 56 is threaded into the outer end 10 of the inlet chamber 8, and a conduit 58 is connected thereto by a sleeve 60. While no spring is shown for seating the ball 36 on the frusto-conical seat 34 in the inlet check valve 62, it is to be understood that such could be provided if desired. However, it normally will be found that inlet fluid pressure from the conduit 58 is sufficient to close, and hold closed, the inlet check valve 62, when a strainer unit, now to be described, is removed from the valve body 4.

Figure 4:
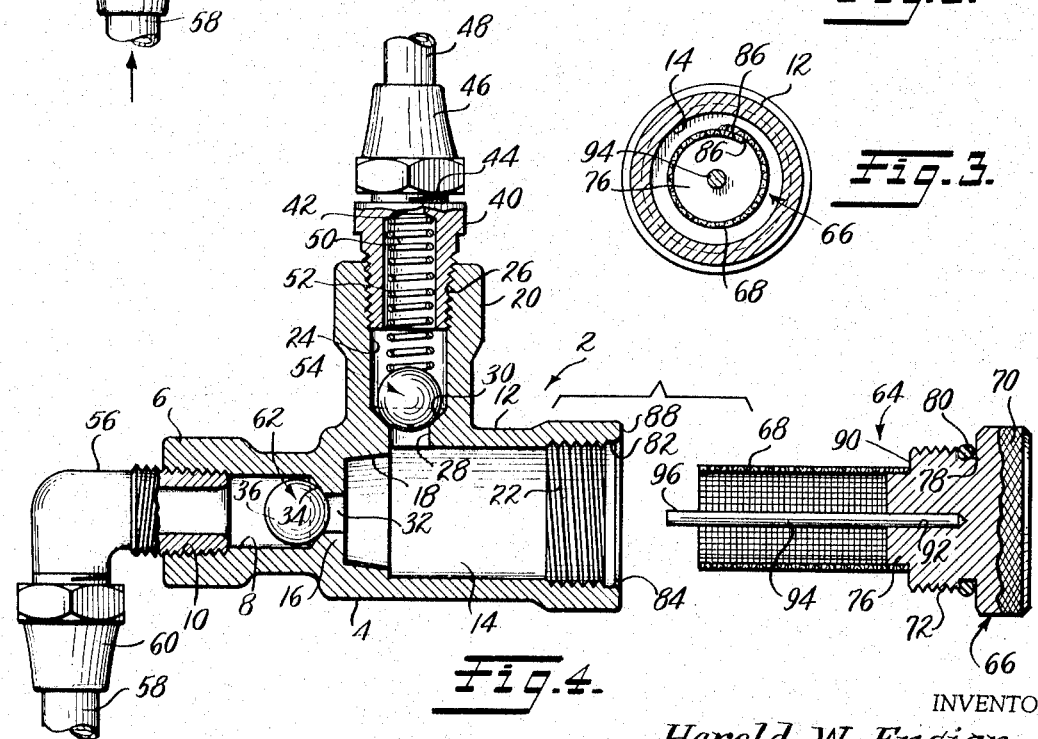
FIG. 4 is a view similar to FIG. 2, but with the strainer unit shown removed from the strainer valve body, and with both the inlet and outlet check valves closed.

The strainer unit of the invention is indicated at 64, FIG. 4, and includes a cylindrical plug 66 and a strainer element 68. The plug 66 has a knurled head portion 70, a reduced threaded portion 72, and a further reduced cylindrical seat portion 76 on which the strainer element 68 is mounted. The threaded portion 72 is receivable within the threaded outer end 22 of the strainer chamber 14, and an annular groove 78 is positioned between said threaded portion and the head portion 70, within which groove is received an O-ring seal 80. The seal 80 is received within a short cylindrical counterbore 82 at the outer end of the strainer chamber 14, and provides a seal between the valve body 4 and the plug 66. The outer end of the counterbore 82 is chamfered at 84 to facilitate entry of the O-ring into said counterbore.

The strainer element 68 will typically be constructed of a rectangular piece of fine-mesh screen rolled into a tube, with the side edges 86 thereof overlapped and soldered to each other. One end of the strainer element 68 is received on the cylindrical seat 76 and may be soft-soldered thereto. The strainer element 68 has an external diameter about equal to the small diameter of the frusto-conical portion 18 of the strainer chamber 14, to thus center the free end of the strainer in said chamber. The strainer element 68 has an axial length such that when the plug 66 is fully threaded into the strainer chamber 14 and the head 70 thereof engages the radial end face 88 of the valve body 4, said strainer element will extend from a radial shoulder 90, between the portions 72 and 76 of said plug, to the partition 16. The frusto-conical chamber portion 18 functions during assembly of the strainer unit 64 in the body 4 to guide the strainer element 68 into proper position within the chamber 14.

The inner end of the plug 66 has an axial bore 92 therein within which one end of a cylindrical, inlet check valve operating rod or stem 94 is press-fitted. The rod 94 is of a length such that when the strainer unit 64 is installed in the valve body 4, the outer end 96 of said rod will extend through the inlet port 32 and will hold the ball 36 away from the seat 34. Thus, the inlet check valve 62 will have been automatically opened as the plug 66 is threaded into the strainer chamber 14, and will thereafter be held in an open position by said rod for so long as the plug 66 remains in place. The operating rod 94 has a diameter substantially less than the diameter of the inlet port 32, so that it will not substantially obstruct flow therethrough.

The strainer valve assembly 2 is shown under operating conditions in FIG. 2, wherein the strainer unit 64 is installed in the valve body 4 so that the operating rod 94 holds the ball 36 of the inlet check valve 62 away from the seat 34. Fluid thus flows from the conduit 58, through the inlet port 32, through the strainer element 68, and through the outlet port 28 into the conduit 48. The pressure of the fluid is sufficient to overcome spring 52, so that the ball 38 of the outlet check valve 54 is held away from the seat 30.

When it is desired to clean or replace the strainer element 68, the plug 66 is merely unthreaded from the strainer chamber 14. As the plug 66 moves axially outwardly, the operating rod 94 is slowly retracted until the ball 36 is forced against the seat 34 by line pressure within the inlet chamber 8, thereby effecting automatic closing of the inlet check valve 62.

When the inlet port 32 is closed during removal of the plug 66, fluid under pressure can no longer flow through the outlet port 28 and hold the outlet check valve 54 open. The spring 52 will then automatically cause the ball 38 to seat on the seat 30, thereby closing the outlet check valve 54. The strainer chamber 14 is then isolated, and the strainer unit 64 can be removed therefrom with the discharge of no more fluid than is contained within the chamber 14.

The length of the threaded portion 72 on the plug 66 and the length of the threaded portion of the chamber 14 are proportioned so that the outer end 96 of the rod 94 will engage the ball 36 while the plug 66 is still threadedly engaged with the valve body 4. Thus, the inlet check valve 62 will close before the plug 66 has been fully removed. A sufficient number of convolutions of the threads remain engaged, during the removal of the plug 66, to prevent leakage through the threaded opening 22. After the unit 64 has been completely removed, the strainer element 68 can be either cleaned or replaced, after which the strainer unit 64 is reassembled with the valve body 4.

Upon reassembly, the threading of the plug 66 through several turns into the threads 22 will cause the outer end of the rod 94 to engage the ball 36, and as the plug 66 is further threaded into the body, the inlet check valve 62 will be slowly opened, thus returning the strainer valve assembly 2 to service. By proportioning the components so that the inlet check valve 62 is not opened until after several convolutions of the threads 72 of the plug 66 are engaged with the threads 22 of the valve body 2, fluid discharge during reassembly is avoided.

Obviously, many modifications and variations of the present invention are possible in light of the above teachings. Therefore, it is to be understood that within the scope of the appended claims, the invention can be practiced otherwise than as specifically described and illustrated.

I claim:

1. A strainer valve, comprising: a one-piece generally T-shaped valve body having an inlet chamber with a threaded inlet at one end thereof for connection with a conduit for fluid under pressure, a transverse partition in said body at the other end of said inlet chamber forming one end of a chamber for receiving a strainer axially aligned with said inlet chamber, said partition having an inlet port connecting said inlet chamber with said strainer chamber; an inlet check valve in said inlet chamber, said inlet check valve being axially insertable into said inlet chamber through said threaded inlet and being arranged to be urged by inlet fluid pressure in a direction toward said strainer chamber to close said inlet port, said strainer chamber having an opening at the end thereof remote from said partition; a plug disposed in said opening; a strainer element in said strainer chamber having one end thereof supported on said plug; means detachably mounting said plug in said opening; means carried by said plug arranged to engage and displace said inlet check valve from said inlet port after said plug has been partially mounted in said opening and to hold said inlet check valve out of engagement with said inlet port when said plug is fully mounted in said opening, said valve body having a hollow discharge leg portion disposed at a point approximately medially of the length of said body and at an angle to said strainer chamber, said discharge leg portion having an outer end threaded for connection with a discharge conduit, said valve body further having an outlet port interconnecting said strainer chamber and said hollow discharge leg portion; and a non-return flow check valve disposed in said hollow discharge leg portion operable to close said outlet port and prevent reverse flow through said outlet port when said plug is removed from said valve body.

2. A strainer valve as recited in claim 1, wherein the strainer chamber is cylindrical, and wherein the inlet port opens onto the inner end wall of the strainer chamber, and wherein the outlet port opens onto the sidewall of the strainer chamber, and wherein the strainer element comprises a cylindrical, perforated element supported at one end thereof on the plug and is open at its other end.

3. A strainer valve assembly as recited in claim 2, wherein the partition at the inner end wall of the strainer chamber is conically recessed and receives and centers the open other end of the cylindrical strainer and forms both a support and closure therefor.

References Cited

UNITED STATES PATENTS

| | | | |
|---|---|---|---|
| 922,657 | 5/1909 | Worsey | 210—234 |
| 2,134,413 | 10/1938 | Munoz | 210—453 X |
| 2,466,304 | 4/1949 | Cooney | 210—136 |

FOREIGN PATENTS

| | | |
|---|---|---|
| 686,520 | 4/1930 | France. |
| 163,252 | 5/1921 | Great Britain. |
| 541,488 | 11/1941 | Great Britain. |

REUBEN FRIEDMAN, *Primary Examiner.*

F. A. SPEAR, *Assistant Examiner.*